Figure 1:
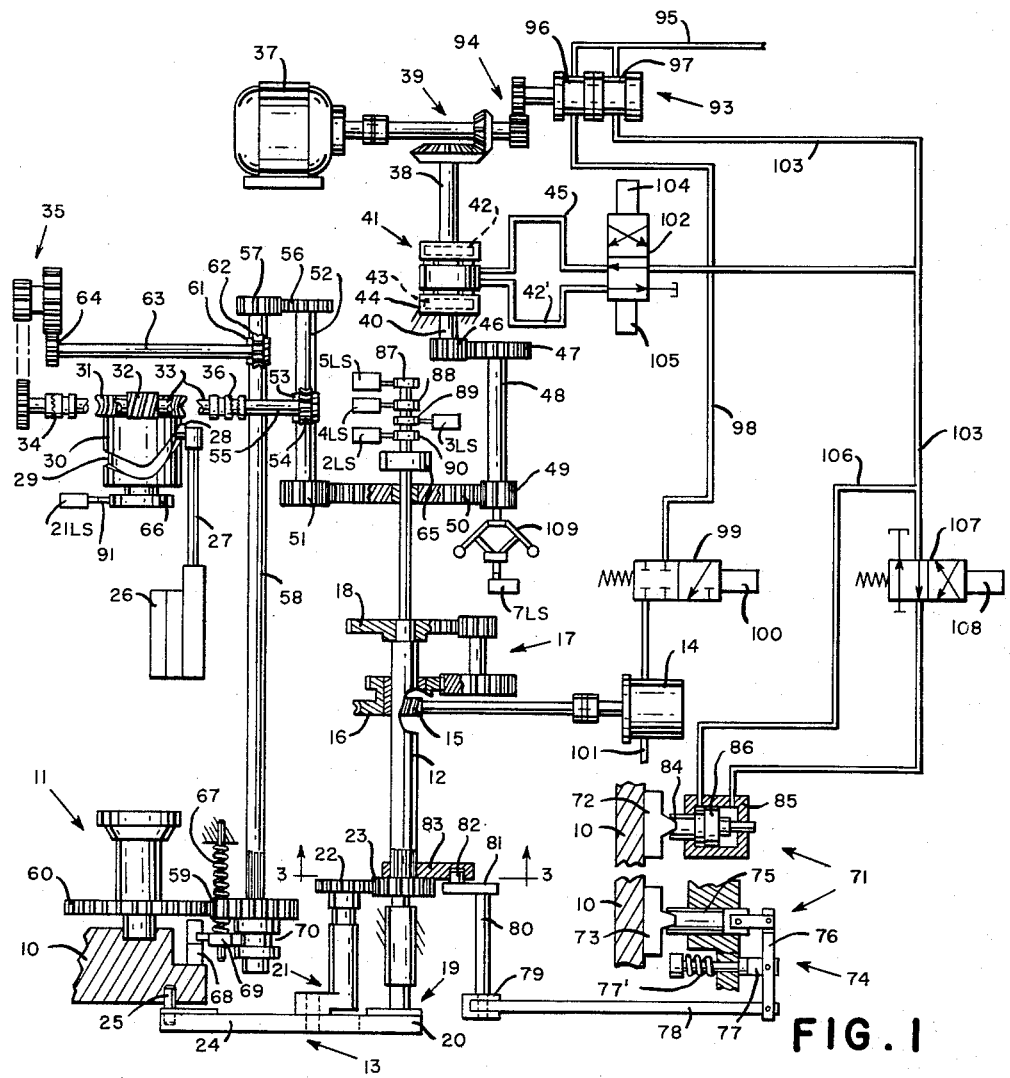

INVENTORS.
EDWARD P. BULLARD III
EDWARD P. BULLARD IV
BY
ATTORNEY.

United States Patent Office 3,251,116
Patented May 17, 1966

3,251,116
MULTIPLE SPINDLE LATHE
Edward P. Bullard III, and Edward P. Bullard IV, Fairfield, Conn., assignors to The Bullard Company, Bridgeport, Conn., a corporation of Connecticut
Filed Mar. 5, 1963, Ser. No. 262,982
6 Claims. (Cl. 29—38)

This invention relates to machine tools, and particularly to an improved multiple spindle lathe having a carrier that is indexed from station to station about a central column, at each station of which a tool supporting head may be mounted for performing operations on work rotated by the spindles.

Multiple spindle lathes are old as evidenced by such a patent as 2,385,605.

The principal object of this invention is to provide a multiple spindle lathe that will be less expensive to manufacture than prior known multiple spindle lathes of the type disclosed in the aforementioned patent.

Another object of the invention is to provide a multiple spindle lathe in which a carrier having a plurality of work supporting spindles mounted on it is indexed from station to station by a hydraulic drive.

Still another object of the invention is to provide such a lathe in which the drive for each spindle is disengaged prior to indexing the carrier only after the spindle has its speed reduced to a predetermined safe limit.

Another object of the invention is to provide such a lathe in which a hydraulic clutch and brake is employed between the main drive for the lathe and the feedworks, as well as the spindle drive.

Another object of the invention is to provide such a lathe in which a dual locking pin arrangement is provided for accurately locating the spindle carrier at each of its index stations.

In one aspect of the invention, a work supporting spindle carrier may be mounted for rotation about a central vertical axis of the lathe, and it may support a plurality of work supporting spindles circularly arranged about said axis. There may be a plurality of tool supporting heads arranged about said axis such that as the carrier is indexed from station to station, the work supporting spindles are brought successively to an accurate position beneath each tool head.

In another aspect of the invention, each of the tool heads is connected to a cam feedworks for imparting to the tool head movements toward and from the work supporting spindles to perform operations on work held by the spindles. Each of the feedworks cams is separately driven from a common bull gear mounted for rotation about the vertical axis of the machine, and this separate drive is adapted to rotate the cam at a feeding rate as well as at a traverse rate.

In still another aspect of the invention, the carrier containing the work supporting spindles is indexed from station to station by a hydraulic drive that is initiated by manually closing a switch when all of the tool supporting heads are in their uppermost positions and the speed of rotation of the spindles is below a predetermined value.

In still another aspect of the invention, a hydraulically operated clutch and brake assembly is provided between the prime mover and a gear drive for rotating the spindles as well as the feedworks cams.

In a still further aspect of the invention, as the carrier is indexed, mechanical and hydraulic locking means are separately rendered effective to ensure accurate location of each spindle relative to its corresponding feedworks.

In still another aspect of the invention, rotation of the carrier indexing mechanism sequentially operates electrical contacts to cause the lathe to perform its various functions in a predetermined order.

The above, other objects and novel features of the improved lathe will become apparent from the following specification and accompanying drawing which is merely exemplary.

Figure 2:
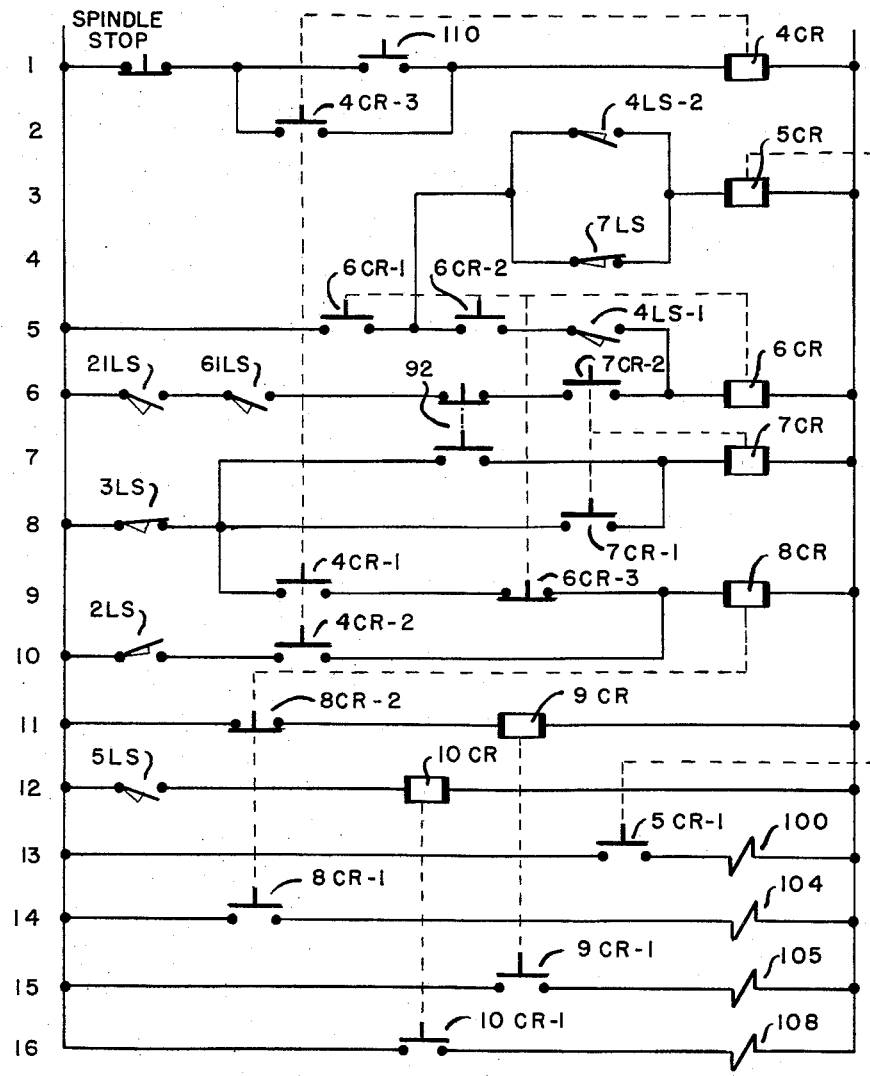

In the drawing:
FIG. 1 is a schematic view of certain components of a multiple spindle lathe to which the principles of the invention have been applied;
FIG. 2 is a wiring diagram for the components shown in FIG. 1; and
FIG. 3 is a sectional view taken along line 3—3 of FIG. 1.

Referring to the drawing, and particularly to FIG. 1, the principles of the invention are shown as applied to a multiple spindle, vertical lathe including a carrier 10 on which are journaled a plurality of work supporting spindles 11 (only one being shown) arranged in a circle around a vertical shaft 12 about which the carrier is adapted to be indexed in a step-by-step fashion by a Geneva stop type of indexing mechanism 13. Accordingly, shaft 12 is adapted to be rotated, and in the embodiment disclosed, a hydraulic motor 14 drives a worm 15 in mesh with a worm gear 16 forming part of a speed reduction gear unit 17, the output gear 18 of which is keyed to shaft 12.

The bottom end of shaft 12 forms a cross head connection 19 with one end of a link 20 of the Geneva stop mechanism 13. A crank 21 is drivingly connected to link 20 and it includes a gear 22 in mesh with a gear 23 keyed to shaft 12. An end 24 of link 20 opposite that of the cross head connection 19 cooperates with pin means 25 at each position around carrier 10 adjacent a spindle 11. Accordingly, admitting supply pressure liquid to motor 14 rotates shaft 12 and crank 21, causing the Geneva stop device 13 to index carrier 10 step-by-step about the axis of shaft 12, all as more fully disclosed in Patent 2,385,605, in which patent the rotary power means is shown as mechanical as distinguished from hydraulic.

A tool supporting head 26 (only one of which is shown) may be located at a plurality of stations about the shaft 12, to which stations the spindles 11 are indexed and accurately locked by means to be described hereinafter. Each head 26 may be connected to a rod 27 having a cam follower 28 at one end that rides in a groove 29 of a cam 30. The cam is adapted to be rotated through 360° to perform a cycle of tool movement for operating on work on spindles 11.

Cam 30 is provided with a worm gear 31 that meshes with a worm 32 on a shaft 33. The shaft 33 is adapted to be driven at any one of a plurality of feed speeds through a clutch 34 and a gear train 35 including pull gears, and at a rapid traverse rate through a clutch 36.

Power for rotating spindles 11 and cam 30 is supplied by an electric motor 37 that drives a shaft 38, through bevel gears 39. A shaft 40 has one end provided with a bearing that is piloted in the end of shaft 38, and a hydraulically actuated clutch and brake unit 41 connects shaft 38 to shaft 40. The unit 41 may include a disk arrangement 42 in which alternate disk elements are connected to the shafts 38 and 40 adjacent the piloted bearing arrangement so that when pressure fluid passes through a line 42', it acts on pistons within unit 41 to force these disks together and thereby drivingly connects shafts 38 and 40. Unit 41 may also include a disk arrangement 43 in which alternate disk means are connected to shaft 40 and to a stationary housing 44. Accordingly, supplying pressure fluid to a line 45 will cause piston means to force the disks on shaft 40 against the stationary disk means on housing 44, thereby stopping shaft 40.

The shaft 40 is fixed to a gear 46 that meshes with a gear 47 fixed to a shaft 48, the opposite end of which supports a gear 49 that meshes with a bull gear 50 which is journaled for rotation about the axis of shaft 12 but independently of said shaft. There may be a gear 51 for each station of the lathe in mesh with bull gear 50, and it may be fixed to a shaft 52. A worm 53 on shaft 52 meshes with a worm gear 54 on a shaft 55 that may be drivingly connected to shaft 33 by clutch means 36 to provide a rapid traverse rate of rotation of cam 30.

Shaft 52 may also support a gear 56 that meshes with a gear 57 fixed to a shaft 58, the latter extending to the bottom of the lathe and having splined thereto a gear 59 which meshes with a gear 60 keyed to spindle 11. Shaft 58 near its upper end has a worm 61 fixed to it that meshes with a worm gear 62 fixed to a shaft 63. Shaft 63 supports a gear 64 that meshes with gearing 35 to drive shaft 33 through clutch 34 at any one of a plurality of relatively slow feed speeds depending upon the pull gears used in gear train 35.

The shifting of clutches 34 and 36 is effected by linkages (not shown) that are controlled by a cam 65 on shaft 12 and a timing disk 66 fixed to cam 30, all in the manner described in Patents 2,385,605 and 2,423,223, to which reference is made for details of construction not specifically disclosed herein.

While gears 59 and 60 can roll out of mesh during the initial stage of indexing of carrier 10, the teeth would at times land tooth-on-tooth if an attempt was made to roll them into mesh at the completion of an index movement. The gear 59 is urged downwardly into mesh with gear 60 by spring means 67. A cam 68 on carrier 10 acts on an element 69 that has a finger which rides in a groove 70 on the hub of gear 59. Accordingly, as carrier 10 begins its index, gear 59 rolls out of mesh with gear 60, and cam 68 raises gear 59 to an elevation above gear 60. Consequently, at the completion of carrier index, the next spindle gear 60 moves into place beneath gear 59 when cam 68 permits lowering of gear 59 into mesh with it. Should the teeth land tooth-on-tooth, immediately upon rotation of gear 59, spring 67 will ensure proper meshing of the teeth.

In order accurately to lock the carrier 10 in each index position during the period when work operations are being performed, a lock pin arrangement 71 is provided for engaging lock elements 72, 73 on carrier 10, there being a set for each station to which the carrier is indexed. The lock pin mechanism preferably comprises a mechanically operated portion 74. It may include a reciprocable pin 75 having a bifurcated end adapted accurately to coact with the element 73. A link 76, pivoted to a link 77 may have its one end pivotally connected to link 75 and its other end pivotally connected to a drawbar 78. The link 77 is normally urged leftwardly (FIG. 1) by a spring 77'. The drawbar 78 may be connected to a crank 79 at one end of a shaft 80. The opposite end of shaft 80 may support another crank 81 having a follower 82 located in a manner to cooperate with a cam 83 that is fixed to shaft 12. The construction and arrangement are such that with the parts in the position shown in the drawing, the lock pin 75 is in engagement with element 73. During the first thirty-five degrees of counterclockwise motion of cam 83, pin 75 is withdrawn. The end 24 of arm 20 of Geneva stop mechanism 13 engages and disengages the rollers 25 on carrier 10 while moving in a straight radial path, and arm 20 comes to rest position without end 24 in engagement with a roller 25. Furthermore, lock pin 75 must be mechanically retracted before index movement of carrier 10 begins, which pin retraction requires a predetermined degree of rotation of cam 83. Accordingly, the retraction of pin 75 is initiated slightly before engagement of the end 24 of arm 20 with a roller 25. Should carrier 10 drift slightly after disengagement of pin 75 and before engagement of end 24 with a roller 25, improper action of the Geneva stop would occur. In order to prevent any tendency to drifting of carrier 10, an auxiliary lock pin 84 is provided for cooperating with the elements 72 on carrier 10. Lock pin 84 is similar to pin 75 but extends into a cylinder 85 and is connected to a piston 86 having different effective areas on each face thereof.

Pin 84 is adapted to form a relatively loose fit with elements 72, and since it can be rendered effective without a predetermined rotation of cam 83, it serves to retain the carrier 10 against drifting both during the engaging and during the disengaging of pin 75 with elements 73.

In order to ensure the proper sequential operation of the various components of the lathe, a series of cams 87 to 90, inclusive, are attached to shaft 12 for actuating electrical switches 5LS, 4LS, 3LS and 2LS, respectively. Additionally, so that the carrier 10 cannot be indexed with a tool in engagement with work on spindles 11, each timing disk 66 may be provided with a dog 91 for closing a limit switch 21LS when its head 26 is in its uppermost position. All of the switches 21LS to 61LS, one for each head 26 of the lathe, are wired in series with a manually operable pushbutton switch 92 that initiates the indexing cycle.

In order to supply pressure fluid to the various hydraulic components, the motor 37 is connected to a pump 93 through gearing 94. Pump 93 is supplied with liquid from a source through a line 95. Pump 93 includes a low pressure stage 96 and a high pressure stage 97. Stage 96 is connected to hydraulic motor 14 through a line 98 leading to a valve 99 that is operated by a solenoid 100. The outlet 101 from motor 14 leads to sump.

The high pressure stage 97 leads to a valve 102 from line 103. Valve 102 is operated by opposed solenoids 104 and 105. A line 106 leads from line 103 to the end of cylinder 85 that is in communication with the smallest area of piston 86; while the line 103 leads to a valve 107 and thence to the opposite end of cylinder 85. Valve 107 is operated by a solenoid 108.

In order to prevent indexing of carrier 10 with spindles 111 rotating at a high rate of speed, a slow speed switch 7LS is connected to shaft 48 through a speed responsive governor 109. Switch 7LS preferably is set to close when the spindles are rotating at speeds less than about 25 r.p.m.

Referring to FIG. 2, the numerals in parentheses in the following text refer to those on the lefthand side of FIG. 2. Closing the pushbutton switch 110 (1) energizes relay coil 4CR (1) which closes contacts 4CR–3 (2) holding 4CR relay energized after releasing pushbutton 110. Energizing relay 4CR (1) closes 4CR-1 contacts (9), and since 3LS is closed when carrier 10 is in an indexed position, 8CR relay (9) is energized. Energizing 8CR (9) closes 8CR–1 contacts (14), thereby energizing solenoid 104 causing pressure fluid to flow through valve 102 from line 103 to line 42', exhausting line 45 to tank. This renders disks 42 effective, driving shaft 40 from shaft 38 and accordingly rotating spindles 11. When the spindles 11 are rotating at speeds in excess of 25 r.p.m., switch 7LS (4) opens, preventing the energizing of relay 5CR (3) and thereby preventing the indexing of carrier 10.

When the working operations at all stations have been completed and the corresponding heads 26 have moved to their upper positions, the last one that arrives there completes the circuit to the upper contacts of pushbutton switch 92 (6) but since contacts 7CR–2 are open, 6CR relay coil (6) is not energized.

Pressing pushbutton switch 92 opens the upper contacts thereof and closes the lower contacts (7) which, since switch 3LS (8) is closed, causes 7CR relay (7) to be energized and held energized after release of switch 92 by holding contacts 7CR–1 (8). Energizing 7CR relay (7) also closes 7CR–2 contacts (6) and when upper contacts of switch 92 close, upon its release, 6CR relay coil (6) is energized since all of the series arranged contacts 21LS to 61LS (6) are closed, all heads 26 being at their upper positions.

Energizing 6CR relay (6) also opens 6CR–3 contacts (9), de-energizing 8CR relay coil (9), thereby closing 8CR-2 contacts (11) which energizes 9CR relay (11). De-energizing 8CR relay (9) also opens 8CR-1 contacts (14), de-energizing solenoid 104; and energizing 9CR relay (11) closes 9CR-1 contacts (15), thereby energizing solenoid 105 (15). De-energizing solenoid 104 and energizing solenoid 105 causes pressure fluid to flow into line 45 while exhausting line 42′. Accordingly, this disengages clutch disks 42 and engages brake disks 43.

When the spindles 11 have decelerated to a speed less than 25 r.p.m., switch 7LS (4) closes, thereby energizing 5CR relay (3) since 6CR-1 contacts (5) are closed.

Energizing 5CR relay (3) closes 5CR-1 contacts (13), thereby energizing solenoid 100 (13), admitting pressure fluid to hydraulic motor 14 and starting the rotation of shaft 12. After 10° of rotation of shaft 12, limit switch 4LS-1 (5) closes, completing the holding circuit for 6CR relay (6), and 4LS-2 switch (2) closes around the switch 7LS (4) to maintain 5CR relay (3) energized after 7LS switch opens upon spindles 11 being rotated above 25 r.p.m. during the next successive cycle and to ensure completion of the index of arm 20 of Geneva stop mechanism 13.

When shaft 12 has rotated another 5° or when its total rotation is 15°, 3LS switch (8) opens, breaking the holding circuit to 7CR relay (7). When shaft 12 has rotated through 35°, 5LS switch (12) closes, energizing 10CR relay (12) thereby closing 10CR-1 contacts (16), thus energizing solenoid 108 (16). This causes the pressure fluid in line 103 leading to the righthand side of cylinder 85 to exhaust to tank, whereupon the pressure fluid in line 106 moves piston 86 rightwardly to release auxiliary lock pin 84.

When shaft 12 has rotated a total of 41½°, the cam 83 will have mechanically withdrawn lock pin 75, and the end 24 of arm 20 will be in contact with a roller 25 on carrier 10. When the shaft 12 has completed 265° of rotation, the 5LS switch (12) opens, de-energizing 10CR relay (12), opening 10CR-1 contacts (16), thereby de-energizing solenoid 108, admitting pressure fluid to the righthand side of cylinder 85 forcing lock pin 84 into cooperating position with element 72 at the new indexed position of carrier 10. When the shaft 12 has rotated to 268°, cam 83 starts to move rod 78 rightwardly, causing lock pin 75 to engage an element 73 to accurately locate carrier 10. The spring 77′ of the mounting for pivot element 77 ensures the proper coaction between lock pin 75 and element 73 in the event slight radial variations of the elements on carrier 10 occur.

When shaft 12 has completed 315° of rotation, 2LS switch (10) closes, energizing 8CR relay (9), closing 8CR-1 contacts (14) and energizing 104 solenoid (14). Energizing 8CR relay (9) opens 8CR-2 contacts (11), de-energizing 9CR relay (11) which opens 9CR-1 contacts (15), de-energizing 105 solenoid (15). De-energizing solenoid 105 and energizing solenoid 104 renders clutch disks 42 active and releases brake disks 43. Thus, spindles 11 and cams 30 begin rotating, starting the downward movement of the tool heads 26 toward the rotating work on spindles 11. After 10° of rotation of timing disks 66 of each cam 30, the corresponding switches 21LS to 61LS (6) open, breaking the initiating circuit to the index control relay 6CR (6).

When shaft 12 has completed 345° of rotation, 3LS switch (8) closes, re-establishing the index setup relay 7CR (7), as well as 8CR relay (9) holding circuit.

At 349° of rotation of shaft 12, 2LS switch (10) is opened, breaking the initiating circuit for 8CR relay (9). At 350° of rotation of shaft 12, 4LS-1 switch (5) opens the holding circuit of index control relay 6CR (6), and 4LS-2 switch (2) opens the holding circuit around the slow speed switch 7LS (4).

When the feed cams 30 have completed a full 360° of rotation, the heads 26 will have completed a cycle. As the heads 26 finish their cycle, switches 21LS through 6LS (6) are closed. The last head 26 to come up completes the circuit to index relay 6CR (6), and upon the chucking of work at the loading station, and pressing of button 92 (6) and releasing it, a new index of carrier 10 is initated.

Although the various features of the multiple spindle lathe have been shown and described in detail to fully disclose one embodiment of the invention, it will be evident that changes may be made in such details and certain features may be used without others without departing from the principles of the invention.

What is claimed is:

1. In a multiple spindle lathe having a carrier supporting a plurality of work supporting spindles that are adapted to be indexed into and out of cooperating position with a plurality of tool supporting heads, separate feedworks means for moving said tool supporting heads toward and from said work supporting spinldes; drive means between each of said feedworks means and a corresponding spindle means on said carrier; main drive means for all of said feedworks means and spindle drive means; prime mover means for supplying power to said main drive means; a hydraulic brake and clutch unit between said prime mover means and said main drive means; crank means for indexing said carrier from station to station; hydraulic motor means for operating said crank means; and velocity controlled switch means responsive to the rate of rotation of said main drive means when said brake is applied for energizing said hydraulic motor means for effecting the indexing of said carrier when the speed of rotation of said spindle means is less than a predetermined value.

2. In a multiple spindle lathe having a carrier supporting a plurality of work supporting spindles that are adapted to be indexed into and out of cooperating position with a plurality of tool supporting heads, separate feedworks means for moving said tool supporting heads toward and from said work supporting spindles; drive means between each of said feedworks means and a corresponding spindle means on said carrier; main drive means for all of said feedworks means and spindle drive means; prime mover means for supplying power to said main drive means; a hydraulic brake and clutch unit between said prime mover means and said main drive means; crank means for indexing said carrier from station to station; hydraulic motor means for operating said crank means; cam means driven by said hydraulic motor means for operating a lock pin means for accurately locating said carried at each of its index positions; and velocity controlled switch means responsive to the rate of rotation of said main drive means when said brake is applied for energizing said hydraulic motor means for effecting the indexing of said carrier when the speed of rotation of said spindle means is less than a predetermined value.

3. In a multiple spindle lathe having a carrier supporting a plurality of work supporting spindles that are adapted to be indexed into and out of cooperating position with a plurality of tool supporting heads, separate feedworks means for moving said tool supporting means toward and from said work supporting spindles; drive means between each of said feedworks means and a corresponding spindle means on said carrier; main drive means for all of said feedworks means and spindle drive means; prime mover means for supplying power to said main drive means; a hydraulic brake and clutch unit between said prime mover means and said main drive means; crank means for indexing said carrier from station to station; hydraulic motor means for operating said crank means; cam means driven by said hydraulic motor means for operating a lock pin means for accurately locating said carrier at each of its index positions; hydraulically actuated auxiliary lock pins means for preventing carrier drift during the actuation of said cam-operated lock pin means; and velocity controlled switch means responsive to the rate of rotation of said main drive means when said brake is applied for energizing said hydraulic motor means for effecting the indexing of said carrier when the speed of rotation of said spindle means is less than a predetermined value.

4. In a multiple spindle lathe, a carrier adapted to be indexed from station to station about an axis of rotation; a plurality of work supporting spindles arranged about said carrier; a plurality of vertically movable tool supporting heads about said axis of rotation; means for indexing said carrier to move said spindles into cooperating position with said tool supporting heads; separate feedworks for each tool head, each having a spindle drive; switch means for each of said feedworks means connected in series relation and arranged to be closed when its corresponding tool head is in its uppermost position; solenoid operated means for stopping said spindles only when all of said tool heads are in their uppermost positions; solenoid operated means for initiating the indexing of said carrier; and velocity controlled switch means for energizing said solenoid operated indexing means when the speed of said spindles is less than a predetermined value in response to the effectiveness of the solenoid operated spindle stopping means.

5. In a multiple spindle lathe, a carrier adapted to be indexed from station to station about an axis of rotation; a plurality of work supporting spindles arranged about said carrier; a plurality of vertically movable tool supporting heads about said axis of rotation; means for indexing said carrier to move said spindles into cooperating position with said tool supporting heads; separate feedworks for each tool head, each having a spindle drive; switch means for each of said feedworks means connected in series relation and arranged to be closed when its corresponding tool head is in its uppermost position; solenoid operated means for stopping said spindles only when all of said tool heads are in their uppermost positions; solenoid operated means for initiating the indexing of said carrier; velocity controlled switch means for energizing said solenoid operated indexing means when the speed of said spindles is less than a predetermined value in response to the effectiveness of the solenoid operated spindle stopping means; cam-operated means for locking said carrier in each of its index positions; and means responsive to rendering said indexing mechanism effective for causing said cam-operated means to release said locking means.

6. In a multiple spindle lathe, a carrier adapted to be indexed from station to station about an axis of rotation; a plurality of work supporting spindles arranged about said carrier; a plurality of vertically movable tool supporting heads about said axis of rotation; means for indexing said carrier; separate feedworks means for each tool head, each having a spindle drive; switch means for each of said feedworks means connected in series relation and arranged to be closed when its corresponding tool head is in its uppermost position; solenoid operated means for stopping said spindles when all of said tool heads are in their uppermost positions; solenoid operated means for initiating the indexing of said carrier; velocity controlled switch means for energizing said solenoid operated indexing means when the speed of said spindles is less than a predetermined value in response to the effectiveness of the solenoid operated spindle stopping means; cam-operated means for locking said carrier in each of its index positions; means responsive to rendering said indexing mechanism effective for causing said cam-operated means to release said locking means; and solenoid operated auxiliary locking means responsive to the rendering effective of said indexing mechanism for preventing carrier drift when said cam-operated locking means is released and until said carrier begins to index.

References Cited by the Examiner
UNITED STATES PATENTS

| | | | |
|---|---|---|---|
| 1,449,464 | 3/1923 | Van Hammersveld | 29—38.1 |
| 1,923,204 | 8/1933 | Hirvonen | 73—820 |
| 2,540,186 | 2/1951 | Bullard | 29—38.1 |
| 2,952,168 | 9/1960 | Leifer | 29—46 |
| 2,967,440 | 1/1961 | Hunter | 74—820 |
| 3,052,011 | 9/1962 | Brainard | 29—26 |

RICHARD H. EANES, JR., *Primary Examiner.*